United States Patent Office 3,420,626
Patented Jan. 7, 1969

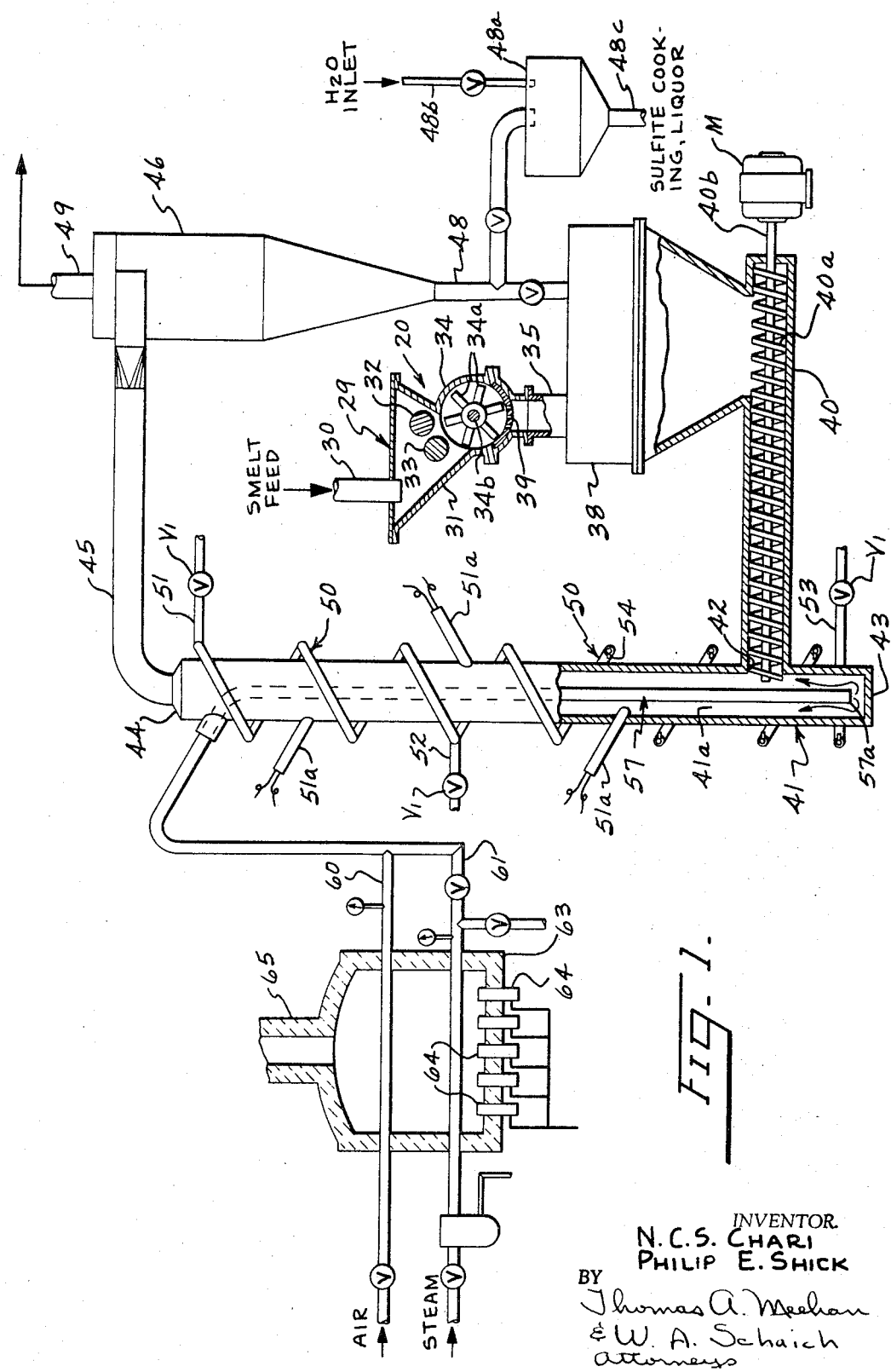

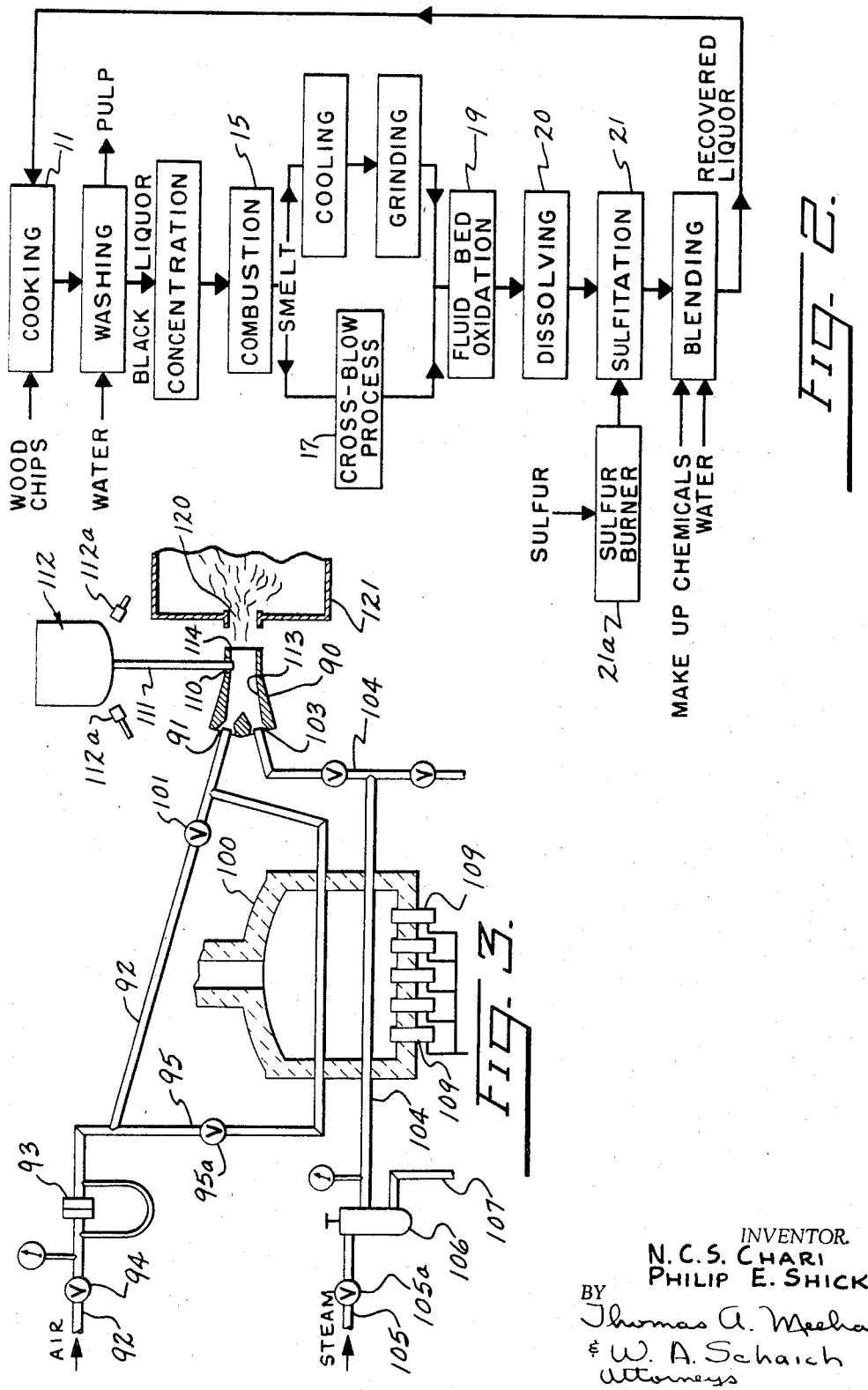

3,420,626
METHOD OF RECOVERING SODIUM SULFITE FROM WASTE SODIUM SULFITE PULPING LIQUOR
Philip E. Shick and Nallan C. S. Chari, Toledo, Ohio, assignors to Owens-Illinois, Inc., a corporation of Ohio
Continuation-in-part of application Ser. No. 130,297, Aug. 9, 1961. This application Dec. 23, 1964, Ser. No. 420,833
U.S. Cl. 23—129                                    4 Claims
Int. Cl. C01d 5/14

The present invention relates to an improved recovery technique, including process and apparatus, of utility in recovering sulfur chemicals used in various pulping operations. Various chemical pulping operations are known in the art of manufacture of paper from wood chips. The present application is a continuation-in-part of our co-pending application Ser. No. 130,297 entitled, "Method and apparatus for the Conversion of Sodium Sulfide to Sodium Sulfite," filed Aug. 9, 1961, and now abandoned.

The present invention will be particulraly described in connection with a method for recovering sulfur chemicals, such as sodium sulfide, and the conversion thereof to sodium sulfite which is capable of forming an aqueous digesting liquor capable of attacking the wood chips in order to remove encrustations, lignins and other complex long chain organic constituents of the wood. In the interest of economy, the sulfur chemicals used to form the digesting liquor, as so-called in the paper industry, are desirably recovered. As is well-known, the digesting liquor is brought into intimate contact with wood chips in a pressure digester where cooking occurs, during and following which the liquor becomes progressively rich in organic sulfonates and sodium salts of organic acids at the expense of the sodium sulfite constituents of the cooking liquor. These products are no longer effective in accomplishing the digestion of wood chips. Thus, it is desirable to convert the spent liquors issuing from the digester to a more active form, in particular, to sodium sulfite. To this end, it is known to concentrate the black liquor, so-called, containing organic sulfonate and salts of organic acids in multiple effect evaporators to effect removal of a large proportion of the water component of the solution. Then the concentrate is introduced as a spray into a furnace designed for the combustion of such liquors. In the combustion furnace, the final water content is "flashed" off, the organic material is burned, and the inorganic material converted to sodium sulfide and sodium carbonate which gather in the bottom as a molten smelt.

The problem to which the present invention presents itself is the conversion of this smelt into active sodium sulfite which can be reintroduced into the digester together with fresh wood chips.

It will be appreciated that the wood chips, after digestion, are transported as a pulp to various washers and thence collected on the Fourdrinier wire as a layer of cellulose fibers from which the water is removed by suction and thence by heat until a thin layer of paper of self-supporting nature is ultimately formed, which is thence rolled onto a mandrel in continuous or endless fashion.

One of the problems inherent in the recovery of the sulfur chemicals is that the conversion of the sulfite and carbonate to sulfite is accompanied by the production of an undesirable fraction of sodium thiosulfate having the formula $Na_2S_2O_3$. The chemically active digesting liquor should be composed of a predominant fraction of sodium sulfite having the formula $Na_2SO_3$. Thiosulfate is undesired since this is accompanied by higher overall chemical losses. Additionally, the presence of thiosulfate accelerates corrosion problems in connection with the materials of construction normally involved in the paper mill.

As is presently practiced in the direct sulfitation systems, essentially all of the sulfur is lost in the process. Fifty percent of the sulfur is lost in the form of hydrogen sulfide discharged from the reaction or digesting tower and fifty percent is lost in the recovery furnace. Direct sulfiting of sodium sulfide and the contemporaneously occurring sodium carbonate is inefficient since the sulfiting with $SO_2$ necessarily results in a production of insert sodium thiosulfate which is a dead load resulting in excess sodium losses. On the other hand, the present invention will permit the efficient and direct oxidation of sodium sulfide to sodium sulfite; any unreacted sodium carbonate being capable of being thence directly sulfited by $SO_2$ to additional sodium sulfite.

Accordingly, it may be stated that a general object of the present invention is to provide an improved technique for recovering sulfur chemicals from the semi-chemical, particularly sulfite, pulping process.

It is a particular object of the present invention to provide a method for converting the sulfide smelt issuing from a recovery furnace into sulfite in a highly efficient and practical manner.

It is also an object of the present invention to provide such a method of recovering sulfur chemicals in the sulfite pulping of wood chips, particularly southern pine.

It is a specific object of the present invention to provide a method ideally suited for efficient oxidation of sodium sulfide in particulate form as achieved in and in accordance with a technique which is capable of being adapted into commercial well-known semi-chemical sulfiting pulping operations.

While the present invention will be described with particular reference to the recovery of sulfide chemicals issuing from a smelt recovery furnace, it will be appreciated that the method and apparatus herein described have utility in a variety of broader applications wherein it is desired to either oxidize, dry or convey finely-divided particulate materials in order to effect a drying or oxidization thereof to a further state. It is a necessary factor of the present invention that the sodium sulfide, or other materials desirably oxidized, be reduced to an extremely finely-divided state and, particularly, the particulate finely-divided solid be of relatively uniform particle size.

It is additionally an object of the present invention to provide a method providing intimate contact between a gas and a solid, and particularly a method which avoids the building up of pressure usually caused by plugging and clogging attendant systems known heretofore.

Very briefly, the present invention contemplates a method of treatment for particulate solids wherein the solids are introduced into one end of an elongated, confined, annular zone, contemporaneously an isolated stream of a gas is directed through a second elongated, confined zone, coaxially within said first zone, to a point proximate the inlet region for said solids and thence reversely through said first zone, said gas being selected to change the character of said solids, said gas being controlled to carry said solids in a fluidized state along said elongated, annular zone to effect treatment of said solids and thereafter collecting said treated solids.

The details of the present invention will become apparent from the more detailed description to follow. In addition, the above-enumerated objects of the present invention, as well as more remote but obvious objects, will become apparent from this referred-to more detailed description taken in conjunction with the annexed sheets of drawings on which there is presented a preferred embodiment of the present invention.

In the drawings:

FIG. 1 is a side elevation view, partly in section, of an apparatus setup suitable for the practicing of the method in accordance with the present invention.

FIG. 2 is a block outline flow diagram representation of a pulping operation including the improved sulfur chemical recovering technique in accordance with the present invention.

FIG. 3 is a side elevational view, partly in section, showing a technique for converting the sodium sulfide smelt into a finely-divided particulate form in the nature of an alternative to the technique shown in the apparatus of FIG. 1.

Referring now more specifically to the drawings and by way of introduction, there is shown in FIG. 2 a block outline flow diagram generally illustrating the pulping operation using the direct oxidation system. At the top of FIG. 2, it can be seen that wood chips are introduced into a cooking step 11 together with recovered cooking liquor for attacking the binding elements, etc. After cooking for a given time, the spent liquor and digested chips are sent to a washing step wherein the pulp fibers are separated and the waste cooking liquors proceed to a concentration step and thence to a combustion recovery furnace 15. The smelt proceeding from the recovery furnace can, in accordance with the broad aspects of the present invention, proceed in either of two directions, either to a cooling and grinding step or to a fluid cross blow process 17 (discussed hereinafter in more detail) and thence to the oxidizing apparatus and method of the present invention identified as a fluid bed oxidation step 19. The oxidized sulfur chemicals, principally in the form of sodium sulfite and the inert sodium carbonate, then proceed to a dissolving tank 20 where water is combined therewith and thence to a sulfitation step 21 to convert the sodium carbonate to sodium sulfite, by introduction of $SO_2$ proceeding from sulfur burner 21a. Thence, the recovered chemicals proceed to a blending tank where water and make-up chemicals are added to adjust the solution to the proper chemical consistency and the resultant blend is recycled to the cooking or digesting step as at 11.

Referring now to FIG. 1, there is disclosed an apparatus ideally adapted for converting sodium sulfide to sodium sulfite. The reference numeral 29 identifies a Wiley mill composed of an inlet 30, a feed hopper 31, guide rolls 32 and 33 and a circular chamber 34 containing a plurality of rotating impact bars 34a extending radially from a driven drive shaft 34b. Beneath the abrasion bars 34a, an outlet 35 extends down into a feed hopper 38. Between the outlet 35 and the impact bars 34, there is situated a screen 39 containing suitable sized openings, e.g., screen size, as to pass the desired finely-divided particulate form of the smelt which is introduced in lump form into the inlet 30. The finely-divided smelt in the hopper 38 then falls by gravity into a tubular screw conveyor 40 which transports the particulate sulfide laterally to the left to dump it into an elongated vertical tube 41 via the lateral opening 42. The screw conveyor contains an internal screw 40a rotating via shaft 40b connected to motor M. The upstanding tube 41 includes a closed bottom wall 43 and an outlet 44 at the top which connects to a conduit 45 which extends laterally to the right to a cyclone separator 46. From the cyclone separator, the now-oxidized product proceeds through a bottom outlet 48 which extends downwardly, then laterally to a hold tank 48a. Valved water inlet 48b delivers water metered to the product at a rate yielding a sulfite liquor which exits through outlet 48c to the digester or to a make-up tank. An upper outlet 49 conveys excess gases and fines to a scrubber and thence to any suitable stack. In accordance with a preferred embodiment, the upstanding cylindrical reactor tube 41 has arranged thereabout a helical burner tube 50 equipped with vertically spaced valved inlets 51 (top), 52 (middle) and 53 (bottom) for controlled introduction of a mixture of fuel gas and air. The burner tube 50 is provided with a plurality of orifices 54 which are aimed at the exterior surface of the tube 41.

Situated axially within the tube 41 is a hollow tube 57 which enters laterally proximate the upper outlet 44 and terminates, below the feed inlet 42 in an open end 57a. The tube 57, in the nature of a distributor tube, connects exteriorly of the reactor tube 41 with a valved air inlet 60 and a valved steam inlet 61, both of which proceed through a preheater furnace 63. The latter has a plurality of burner elements 64 along its bottom and a vent outlet 65 above. Suitable stream traps and valves are included and controlled to deliver a mixture of hot steam and air in proportions and for a purpose as will be described hereinafter.

The apparatus as just described is well adapted to receive a continuous supply of particulate solids via the screw conveyor 40 through the inlet 42, while simultaneously a predetermined supply of air and steam is introduced at the top via tube 57 proceeding axially downwardly within tube 41 to a position beneath the feed inlet 42 and thence in uninterrupted fashion into the tube 41 near the bottom 43. The steam and air then reverses direction to flow upwardly in the annular chamber or zone 41, defined by the space 41a between the reactor tube 41 and distributor tube 57 which are in concentric relationship. The air and steam gas rate is controlled relative to the rate and particle size of the ground sulfide feed so that the particulate solids are entrained in the hot gas and proceed upwardly and turbulently, providing efficient solid/gas contact, e.g., defining a so-called "fluidized bed" or "fluidized state," preferably characterized by a minimum of vertical migration by individual particles in relation to adjacent particles. Stated otherwise, the particles should proceed uniformly up the annular space but, at the same time, turbulently with respect to immediately surrounding gas. The helically coiled burner 54 serves to very efficiently control the temperature of the entire "bed" of fluidized or entrained particles, which extend from the bottom of the conduit 41 near the inlet 42 all the way to the outlet 44 at the top. Each of the fuel gas/air inlets 51, 52 and 53 for the helical burner coil are individually valved for careful control of the temperature in order to meet the particular situation at different levels. It will be appreciated that probe thermocouples 51a (3 shown) may be inserted into the annular chamber 41a and these connected to suitable temperature controllers (not shown), in turn controlling the valves $V_1$ of inlets 51, 52 and 53 for metered control of fuel gas/air mixture entering the helical coil.

Instead of converting the smelt to finely-divided form by physical attrition or screening, as by the Wiley mill 29 shown in FIG. 1, there may be used an apparatus generally as shown in FIG. 3. The heart of this apparatus is a hollow cross blow nozzle 90, provided with an aft offset inlet 91 connecting through conduit 92, an orifice meter 93 and, a valve 94 to the air supply as shown. A line 95 proceeds from line 92 through an oven superheater 100 and thence back to line 92. Valves 95a and 101 control the flow through line 95. The lines 95 and 92 can be controlled so that both heated and unheated air can be metered to the inlet 91. Cross blow nozzle 90 also includes an aft similarly offset inlet 103 to which is connected a line 104 proceeding from a steam supply 105, through a valve 105a and pressure regulator 106. The pressure regulator includes a condensate line 107. From the pressure regulator, the steam proceeds through the superheater 100 and thence to line 104 and into the inlet 103. The inlets 103 and 91 are slightly axially offset relatively. The burners 109 in the bottom of the superheater transfer heat to the steam and air lines 104 and 95, respectively. The cross blow nozzle additionally includes an upper inlet 110, generally normal to the inlets 91 and 103, and connects with conduit 111 extendings from a smelt pot 112; the bottom of which is heated by radially located heaters 112a to maintain the sodium sulfide-sodium carbonate smelt in molten liquid form.

In the operation of this unit, the smelt proceeds from pot 112 downwardly through the conduit 111 and into the interior of the nozzle 90, where it is met by the stream of steam and air proceeding to the right through the inlets 91 and 103. The interior of the cross blow nozzle defines a venturi contour 113 whereby the liquid smelt, as it proceeds through the inlet 110, is contacted by a blast of the gas composed of steam and air proceeding at sonic to supersonic velocities. The smelt in pot 112 is maintained at about 2000° F. While heated air can be used alone, the sulfide contacted thereby has a fair proportion thereof converted to undesirable sulfate. In contrast, the combination of steam and air as shown in FIG. 3 results in a development of a sodium sulfate conversion of only about 10%.

The smelt, when contacted by the blast of air and steam, proceeds out outlet 114 and immediately passes via opening 120 into a collection chamber 121, where finely-divided particles of the smelt are collected and thence transported, for example, to the feed hopper 38 shown in FIG. 1, from whence they are transported to the fluidized bed tube 41 in the manner as described hereinbefore.

EXAMPLE I

An apparatus as illustrated in FIG. 1 was constructed in which the fluidized bed reactor tube 41 consisted of a hollow schedule 40 pipe having a diameter of 1½" and a length of 45½". The air and steam distributor pipe 57 is composed of a ¼" diameter schedule 40 pipe entering through a side section at the top of the reactor 41. The distributor tube extended downwardly to terminate in an open end 57a spaced about ½" from the bottom wall 43. A helical coil 50 fabricated of a ¼" copper tubing surrounded the reactor tube 41 and is provided with a plurality of holes 54 measuring 0.05" in diameter, drilled so as to face the reactor. A charge of molten smelt was collected from the bottom of a combustion furnace to which was fed a spray of concentrated residual black liquid from pulp digesters of a paper mill. The smelt was cooled to a solid state and crushed to a fineness of particle size, as follows, expressed as mesh (United Bureau of Standards) corresponding to mass percent.

| Mesh (U.S.B.S.): | Mass (percent) |
|---|---|
| −30 +40 | 12.2 |
| −40 +50 | 17.5 |
| −50 +70 | 17.4 |
| −70 +100 | 16.5 |
| −100 +140 | 15.6 |
| −140 +200 | 10.4 |
| −200 +270 | 6.4 |
| −270 +400 | 4.0 |
| Total | 100.0 |

Of this, the fraction of the charge between −70 +140 corresponding to an average particle size of 0.0062 inch diameter was charged to the reactor 41 via the screw conveyor 40. The charge of smelt had an analyzed composition as set forth in Table 1, column (F) expressed as a mole fraction of ingredients listed. The fuel gas/air mixture fed to the helical coil burner 50 was controlled so that the flame issuing from holes 54 provided a uniform temperature within the reactor tube of 1100° F. for the approximate 10-minute run. The air supply line 60 measured 20 pounds per square inch gauge, while the steam flow rate was 85 grams per minute at 15 pounds per square inch gauge. Table 1 also lists in column (P) the mole fraction of the same components as determined by analysis of the recovered product produced for the 10-minute run.

TABLE 1

| Component | Mole fractions [M.F.] | |
|---|---|---|
| | Feed (F) | Product (P) |
| Na₂S | 0.2610 | 0.0086 |
| Na₂SO₃ | 0.0133 | 0.2546 |
| Na₂SO₄ | 0.0250 | 0.0379 |
| Na₂CO₃ | 0.6974 | 0.6884 |
| Na₂S₂O₃ | 0.0033 | 0.0105 |
| | 1.0000 | 1.0000 |

The particle fed to the fluidized bed reactor measured, on an average, 0.006 diameter in inches. The density of the particle was 134 pounds per cubic foot. As can be seen from Table 1, the oxidized product (P) was composed principally of sodium sulfite [Na₂SO₃, M.F.=0.2546] and sodium carbonate [Na₂CO₃, M.F.=0.6884]. The analysis of the product as shown in Table 1 compared with the feed (F) reveals a calculated conversion to sodium sulfite of 93.6%.

Thus, percent conversion to Na₂SO₃

$$= \frac{100}{0.261}\left[\frac{0.6974}{0.6884} \times 0.2546 - 0.0133\right]$$

$$= 93.6\%$$

It is a particular feature of the present invention that the design as disclosed in FIG. 1 features a distributor tube 57 having a completely open bottom outlet end 57a, thus avoiding the clogging and plugging normally attendant the use of multi-orifice plates, screens or sintered porous plate(s), usually employed in connection with fluidized bed systems in which the fluidizing medium is introduced at the bottom of the reactor. Most frequently, the apertures or orifices associated with these plates, screens and like devices become plugged, whereby the pressure drop increases and the efficiency of the fluidization, oxidation, or the like, drops rapidly.

In Example I described just above, the conversion of the smelt to sulfite involved a heat of reaction in the neighborhood of 173,000 calories per mole at a reaction temperature 1100° F. This heat was partially absorbed, in accordance with another desirable feature of the present invention, by the incoming air and steam which proceeded through the inner distributor tube 57 extending from the top of the reactor tube 51, as shown in FIG. 2, to the bottom, therefore providing a more uniform temperature distribution [thereby preventing overheating of the bed], more uniform oxidation and further reduction of the chance of plugging or clogging.

It is another feature of the present invention that the solid particulate material is fed laterally from a supply hopper maintained with an adequate supply of the finely-divided smelt, thereby precluding entrapment of air which would otherwise interfere with the fluidization phenomena occurring in the reactor tube 41.

EXAMPLE II

Utilizing the apparatus described in Example 1, a number of runs similar to that described in Example I were carried out at different temperatures and different feed rates for the smelt. The latter was effected by using a constant batch feed of 250 parts of smelt but varying the time of the run. These runs are summarized in Table 2 below.

TABLE 2

| Run No. | Temp. (° F.) | Steam/air volumetric ratio | Time (min.) | Percent conversion to— | | |
|---|---|---|---|---|---|---|
| | | | | Sulfite | Sulfate | Thiosulfate |
| 1 | 350 | 1/30 | 15 | 31 | (*) | (*) |
| 2 | 359 | 1/30 | 20 | 34 | (*) | (*) |
| 3 | 350 | 1/30 | 45 | 48 | (*) | (*) |
| 4 | 500 | 1/30 | 30 | 72 | 4 | 1 |
| 5 | 500 | 1/30 | 45 | 70 | 5 | 2 |
| 6 | 670 | 1/30 | 20 | 76 | 4 | 2 |
| 7 | 670 | 1/30 | 30 | 87 | 6 | 3 |
| 8 | 670 | 1/30 | 45 | 85 | 9 | 3 |
| 9 | 670 | 1/2 | 15 | 81 | 3 | 6 |
| 10 | 740 | 1/30 | 10 | 69 | 4 | 1 |
| 11 | 740 | 1/30 | 30 | 90 | 7 | 3 |
| 12 | 740 | 1/30 | 30 | 90 | 7 | 3 |
| 13 | 740 | 1/30 | 45 | 85 | 9 | 3 |
| 14 | 1,100 | 1/30 | 10 | 64 | 32 | 2 |
| 15 | 1,100 | 1/2 | 10 | 90 | 5 | 3 |
| 16 | 1,100 | 1/2 | 15 | 87 | 7 | 2 |

*Negligible.

In the runs summarized in Table 2, the smelt was the same in each run and constituted 250 parts. The feed smelt had an analysis as listed in Table 1. As can be seen from Table 2, percent conversion to sulfite increased generally with increased temperature. Furthermore, a higher ratio of steam in the fluidizing medium tended to definitely reduce the conversion to sulfate. Generally, it was found that an increase in temperature in the fluidized bed, during which oxidation took place, produced a corresponding increase in conversion to sulfate as well as sulfite. An increase in the proportion of steam in the gaseous fluidizing medium, however, had the beneficial effect of contributing a preferential or selective oxidation to sulfite. This was most convincingly shown from a comparison of Runs 14, 15, and 16. In Run 14, at 1100° F. wherein the fluidizing medium represented a steam/air ratio of 1/30, conversion to sulfate measured 32%. In contrast, Runs 15 and 16, including steam/air in volumetric ratio of 1 to 2, yielded a large increase in the conversion of the sulfide to sulfite and a significant lowering of the conversion of the sulfide to sulfate.

In accordance with the present invention, we have determined that two factors influence the conversion of the sulfide to sulfite. One of these factors is temperature. Thus, a temperature of at least 350° F. is necessary to achieve a conversion of sulfide to sulfite in the range of 30 to 48%. Most preferably, of course, the temperature of the fluidized bed is controlled to measure at least about 500° F. since the conversion of sulfide to sulfite unexplainedly jumps to about 70% and higher, e.g., 90%. Temperatures in excess of 1100° F.–1200° F. are not particularly beneficial and, in fact, to be avoided since the fluidization efficiency drops rapidly due to agglomeration of the particles which become sticky at such temperatures. Another factor of importance with respect to conversion is the relative volumetric proportion of steam and air as the fluidizing medium. As much as 5 parts by volume of steam per 1 part by volume of air can be employed. However, any increase in steam over this value will favor an increase in the amount of thiosulfate and is therefore not desired. At the other extreme, air alone may be employed as the fluidizing medium, but high conversions (about 70% or higher) will be obtained only where the temperature of the fluidized bed is maintained at a temperature of about 500° F. or higher, preferably higher. In other words, under these conditions the steam/air ratio equals 5/1 to 1/∞.

In accordance with a preferred aspect of the present invention, we conduct the treatment of finely-divided smelt in the fluidized bed using, as a fluidizing medium, a mixture of steam and air in the relative volumetric ratio ranging from 5.0 to 1.0 parts of steam to 1.0 to 50.0 parts by volume of air. Expressed as a ratio, the latter is conveniently expressed as:

Steam/air = 5/1 to 1/50

Better control and more uniform conversion is obtained where the ratio of steam to air is maintained within the following range:

$$\frac{\text{Steam}}{\text{Air}} = \frac{2}{1} \text{ to } \frac{1}{10}$$

The optimum in conversion of the sulfide component to sulfite with a minimum of side reactions and by-products such as sulfate and thiosulfate is achieved where the volumetric amount of air predominates as particularly represented by a steam/air volumetric ratio of 1 to 2.

In accordance with this invention, it is deemed most desirable to provide for considerable size uniformity of the particulate, solidified smelt. Efficiency of fluidization "through-put," achievement of equilibrium and resultant overall optimum conditions with respect to the conversion of the smelt to a product high in sulfite is best served when a major proportion of the particulate solids fall within the range of from about 0.0025 inch in diameter to about 0.0125 inch in diameter. Ideally, from the standpoint of the optimum in fluidization efficiency and high conversion to sulfite, substantially all of the particulate solids should fall within the aforesaid range.

To achieve fluidization, oxidation and actual movement of the finely-divided particles through the fluidized bed, it is necessary that the fluidizing air be at least maintained at minimum velocity depending upon the diameter of the particle. Thus, for a particle 0.002" in diameter, a superficial air velocity of 0.6 foot per second measured at 70° F. and 14.7 pounds per square inch absolute was sufficient. On the other hand, for a particle 0.006" in diameter, air velocity must be at least 1.5 feet per second. For a particle diameter 0.010" in diameter, the velocity must be at least 2.0 feet per second. For a positive 0.020" in diameter, the air velocity must be at least 3.0 feet per second. The reaction can be conducted either by dilute phase or dense phase.

It is contemplated as a desired procedure within the practice of this invention that the product from the fluidized reactor chamber be dissolved in water and any residual sodium carbonate converted to sodium sulfite by bubbling sulfur dioxide ($SO_2$) through the solution. Since the dissolved product is substantially free of sodium sulfide ($Na_2S$) by reason of the substantial oxidation thereof to sulfite, formation of undesired thiosulfate is avoided.

While specific details of construction including process details have been disclosed herein, it should be appreciated that such is done in compliance with the provisions of the patent statutes requiring disclosure of a preferred embodiment, all obvious equivalents of the foregoing being intended to be included within the scope of the claims unless clearly violative of the language in which the claims are expressed.

We claim:

1. In the method of recovering sodium sulfite from waste sodium sulfite liquor used in chemical pulping of wood, comprising the steps of concentrating said liquor and burning the resultant concentrate to form a molten smelt containing sodium sulfide, the improvement comprising:

cooling and reducing said smelt to relatively finely-divided particles, introducing said particles laterally into an upwardly moving confined stream of steam and air whereby said particles are "fluidized" in said stream and moved upwardly therein, said stream comprising a mixture of two to one parts by volume of steam and one to thirty parts by volume of air, and maintaining the temperature of said stream at from about 500° F. to about 1200° F., thereby promoting selective oxidation of the aforesaid sodium sulfide to sodium sulfite.

2. The method as claimed in claim 1, wherein said stream comprises a mixture of two to one parts by volume of steam and one to ten parts by volume of air.

3. The method as claimed in claim 1, wherein said particles measure from about 0.0025 to 0.020 inch in diameter.

4. A process of treating previously concentrated, burned and solidified material containing sodium sulfide to increase the conversion of the sodium sulfide to sodium sulfite which comprises, pulverizing said material in solid state, introducing said pulverized material into an upwardly moving "fluidized" bed, said "fluidized" bed including as a fluidizing medium, a mixture of about one part by volume of steam and about two parts by volume of air, said "fluidized" bed bringing said fluidizing medium into intimate contact with said pulverized material and moving said material upwardly, and maintaining the temperature of said fluidized bed between about 500° F. and about 1200° F. to thereby increase selective oxidation of the sodium sulfide in said pulverized material to sodium sulfite.

References Cited

UNITED STATES PATENTS

| 2,647,738 | 8/1953 | Trainer | 263—43 |
| 1,023,179 | 4/1912 | Strickler | 23—129 |
| 2,795,860 | 6/1957 | Wright et al. | 34—10 |
| 2,813,779 | 11/1957 | Faatz | 23—212 |
| 3,097,923 | 7/1963 | Arkless | 23—1 |
| 1,659,193 | 2/1928 | Drewsen | 23—129 |
| 2,642,336 | 6/1953 | Greenawalt | 23—129 |

OTHER REFERENCES

Othmer: Fluidization, 1956, pp. 1 and 104, published by Reinhold Publishing Corp., New York.

Chem. Engineering, January 1947, pp. 105–108, U.S. Patent Office Library, Fluidization in Chem. Reactions.

Chem. Engineering, July 9, 1962, pp. 125–132, Where Fluidized Solids Stand Today.

Jour. of Chem. Ed., vol. 24, No. 6, June 1947, p. 306, Fluid Solids.

EARL C. THOMAS, *Primary Examiner.*

MAURICE A. BRINDISI, OSCAR R. VERTIZ,
*Examiners.*

B. H. LEVENSON, *Assistant Examiner.*

U.S. Cl. X.R.

23—48; 162—30

UNITED STATES PATENT OFFICE
CERTIFICATE OF CORRECTION

Patent No. 3,420,626                           January 7, 1969

Philip E. Shick et al.

It is certified that error appears in the above identified patent and that said Letters Patent are hereby corrected as shown below:

Column 1, line 63, "sulfite" should read -- sulfide --. Column 5, line 56, "liquid" should read -- liquor --. Column 7, TABLE 2, second column, line 2 thereof, "359" should read -- 350 --.

Signed and sealed this 17th day of March 1970.

(SEAL)
Attest:

Edward M. Fletcher, Jr.

Attesting Officer

WILLIAM E. SCHUYLER, JR.

Commissioner of Patents